United States Patent
Skultety-Betz et al.

(10) Patent No.: US 8,020,425 B2
(45) Date of Patent: Sep. 20, 2011

(54) LOCATING DEVICE, AND METHOD FOR CALIBRATING A LOCATING DEVICE

(75) Inventors: Uwe Skultety-Betz, Leinfelden-Echterdingen (DE); Bjoern Haase, Stuttgart (DE); Michael Mahler, Leinfelden-Echterdingen (DE); Ulli Hoffmann, Nieffern-Oeschelbronn (DE); Reiner Krapf, Reutlingen (DE); Christoph Wieland, Herrenberg-Kuppingen (DE)

(73) Assignee: Robert Bosch GmbH, Stuttgart (DE)

( * ) Notice: Subject to any disclaimer, the term of this patent is extended or adjusted under 35 U.S.C. 154(b) by 332 days.

(21) Appl. No.: 11/596,551

(22) PCT Filed: Mar. 21, 2005

(86) PCT No.: PCT/EP2005/051291
§ 371 (c)(1),
(2), (4) Date: Sep. 4, 2007

(87) PCT Pub. No.: WO2005/111663
PCT Pub. Date: Nov. 24, 2005

(65) Prior Publication Data
US 2008/0148803 A1 Jun. 26, 2008

(30) Foreign Application Priority Data
May 12, 2004 (DE) .................. 10 2004 023 330

(51) Int. Cl.
*G01B 3/30* (2006.01)
(52) U.S. Cl. ............................................. 73/1.79
(58) Field of Classification Search ............ 73/1.79
See application file for complete search history.

(56) References Cited

U.S. PATENT DOCUMENTS

| | | | | |
|---|---|---|---|---|
| 4,767,973 A | * | 8/1988 | Jacobsen et al. | 318/652 |
| 4,887,066 A | | 12/1989 | Marek | |
| 5,337,002 A | | 8/1994 | Mercer | |
| 5,507,179 A | * | 4/1996 | Gamble et al. | 73/105 |
| 5,821,409 A | * | 10/1998 | Honma et al. | 73/105 |
| 2003/0218469 A1 | | 11/2003 | Brazell et al. | |

FOREIGN PATENT DOCUMENTS

| | | |
|---|---|---|
| DE | 102 07 477 | 9/2003 |
| EP | 1 341 005 | 9/2003 |

OTHER PUBLICATIONS

International Search Report, PCT International Patent Application No. PCT/EP2005/051291, Mar. 21, 2005.

* cited by examiner

*Primary Examiner* — Hezron Williams
*Assistant Examiner* — Alex Devito
(74) *Attorney, Agent, or Firm* — Kenyon & Kenyon LLP

(57) ABSTRACT

A locating device, in particular a handheld locating device, for detecting objects enclosed in a medium, includes a first device for detecting objects enclosed in a medium, and having a control and evaluation unit for measurement signals of the locating device. The device has a second detection device that makes it possible to detect a predeterminable distance d of the locating device from a surface of a medium. In addition, a method for calibrating a measurement device, in particular for calibrating a handheld locating device for detecting objects enclosed in a medium, a reference measurement for calibrating the measurement device is carried out only after at least one measurement has been carried out of a distance d of the measurement device from a surface of a medium.

6 Claims, 4 Drawing Sheets

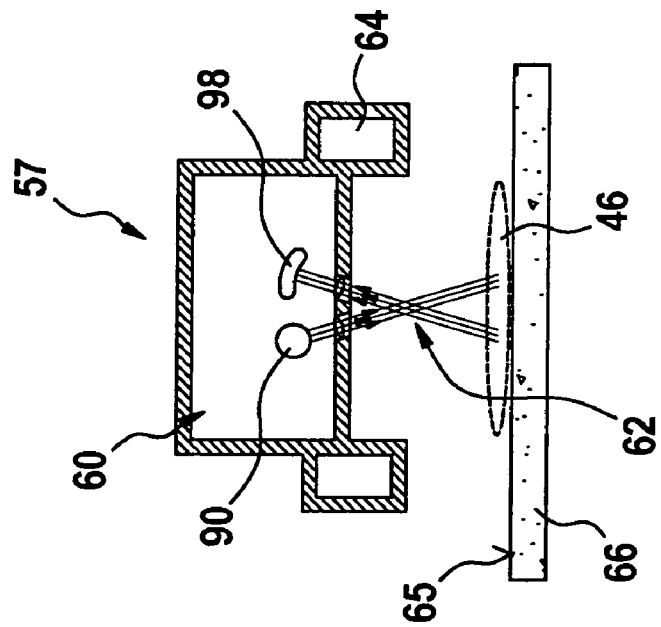

LOCATING DEVICE, AND METHOD FOR CALIBRATING A LOCATING DEVICE

FIELD OF THE INVENTION

The present invention relates to a locating device, e.g., a handheld locating device, for detecting objects enclosed in a medium. In addition, the present invention relates to a method for calibrating a measurement device, e.g., for calibrating a handheld measurement device for detecting objects enclosed in a medium.

BACKGROUND INFORMATION

Locating devices for detecting objects enclosed in a medium are used for many applications in the area of manual work and interior finishing work, for example for locating electrical lines or water pipes. In addition to the concrete realization of the actual measurement function, the operation of the device is of decisive importance for the quality of the measurement results. A measurement device that is highly valuable from the point of view of technology may, in actual use in the field, achieve only a low degree of measurement success if the user operates it incorrectly, or proceeds on the basis of false assumptions when operating the device.

Among locating devices that are typically used to detect lines, pipes, metal beams, or wooden beams in walls, ceilings, and floors, it is possible to distinguish between various types of device based on the detection method used.

Thus, for example inductive devices produce a magnetic field that is disturbed by enclosed metallic objects. The magnetic field modified in this manner is measured by a detector having one or more coils, so that the position of the enclosed metallic object can be located by shifting or moving the locating device over the surface of the medium enclosing the object. A disadvantage of detectors of this type is that only metals can be detected.

A second class of locating devices, which can be described as capacitive devices, use a measurement capacitor in the measurement device to actively construct an electrical field that is disturbed by objects that are enclosed in the medium, e.g., a wall, a ceiling, or a floor. However, such a field does not penetrate very far into the medium being examined. For this reason, these devices are used primarily as stud finders, because they are capable of locating in particular wooden beams situated behind wall panels, such as for example plasterboard sheets or wooden paneling.

In addition, mains voltage detectors acquire the alternating voltage field of a mains voltage line capacitively, but passively, i.e. without producing an electrical field of their own, and are thus able to indicate the position and path of active electrical lines in walls.

More recently, high-frequency detectors use a measurement capacitor to produce an electromagnetic high-frequency field that can penetrate deeply into a medium being examined. When the detector passes over the surface of the medium being examined, internal changes in the material, such as those caused for example by an enclosed object, are acquired through a change of the dielectric constants of the measurement capacitor, and are located. In measurement devices of this type, it is not important whether the objects are made of metal, plastic, gases, or liquids, or contain these. It is sufficient for the electrical properties of the enclosed object to differ from those of the surrounding medium, such as for example a wall material.

Radar devices send out radar pulses that can be reflected back by objects hidden in a medium. By evaluating the reflected radar pulses, it is possible to gain knowledge of the objects enclosed in the medium.

Most of these classes of devices have in common that in order to achieve useful measurement results they must be calibrated, in particular when being switched on, and/or at regular intervals. During this calibration, an internal electronic balancing is usually carried out that is supposed to take place in a situation in which no object to be located is situated in the vicinity of the sensor.

Thus, for example metal-locating devices must be calibrated at a large distance from any metal in the vicinity. For this purpose, the device is typically held in the air, away from the wall to be examined. After the calibration has taken place, the device can be placed on the medium to be examined, for example a wall, a floor, or a ceiling, in order to locate hidden objects. Apart from the fact that such a calibration process is time-consuming, the calibration process itself entails a certain risk, because in the case of a wrongly performed calibration it is also possible for false positive or false negative measurement results to occur. In the worst case, damages to property or even to persons can result from such a miscalibration.

On the other hand, many capacitive locating devices are to be calibrated by a reference measurement in which the measurement device is in direct contact with a wall.

SUMMARY

The locating device according to example embodiments of the present invention for detecting objects enclosed in a medium has, on the one hand, device(s) for detecting the objects enclosed in the medium. Besides this detection device, the locating device has device(s) that allow it to measure a predeterminable distance of the locating device from a surface of a medium, and thus to provide that the device either maintains a necessary minimum distance from the medium or else is clearly placed on the surface of the medium. With the aid of these two device, which form a distance sensor mechanism for the measurement device, it may thus be provided that the locating device is situated such that a reference measurement may be carried out in order to calibrate the measurement device. Such reference measurements are, for example in the case of inductive locating sensors, carried out in the air, in which case it should be provided that no object is sufficiently close to the detection unit for the location of the enclosed objects. Such an object would falsify the reference or null measurement carried out for the calibration, and would thus result in a false null balancing of the measurement device. In particular, in this case the locating device provides, using a wall distance sensor mechanism, for a minimum distance that is required for a reference measurement.

On the other hand, there are measurement devices, such as capacitively operating devices referred to as stud finders or beam detectors, that in order to be calibrated must be placed onto a wall to be examined at a point at which no beam is located. The pure wall signal measured in this manner then corresponds to the reference or calibration signal. In this case, the device is to be placed onto the wall in order to provide contact with the wall. In this type of measurement device, the distance, predeterminable to the device, between the device and a surface of a medium is thus equal to zero. This special case of the vanishing distance of the measurement device from the wall can, in certain cases of application of measurement devices that must be calibrated in the air, already be sufficient to signal to the measurement device and to the user that under these conditions a calibration measurement for this specific measurement device does not make sense, because it is subject to error.

The second detection device, representing the distance sensor mechanism, may have a capacitive sensor. A capacitively constructed sensor sets up an electrical or electromagnetic field between its electrodes. If the surrounding medium changes in this field, for example due to the fact that the measurement device originally directed into the air moves closer to the wall, there then results the electrical or electromagnetic field of the capacitor, due to the differing dielectric constants of the medium entering the measurement field of the measurement capacitor. Such a change in field is measurable.

The measurement capacitor, which is a component of the first device for detecting objects enclosed in a medium, may simultaneously also be used as a distance sensor mechanism, and may thus also form the second detection device. Through corresponding wiring of the measurement capacitor for locating, it is thus possible also to realize the distance sensor mechanism using the same components. This may provide a compact construction of the locating device. The first and the second device are provided by the same component.

The second detection device, forming a distance sensor mechanism, may have an optical sensor for determining the minimum distance of the measurement device from the surface of a medium to be examined. Here, all types of optical detectors may act as a sensor. Thus, for example, as is known from the triangulation method, a focused light beam, for example of a laser, may obliquely illuminate the surface of a medium that is to be examined. A light-sensitive receiver, such as for example a CCD array, detects the radiation intensity reflected by the wall at a defined angle. This angle may be adjusted such that emanated light falls back on the receiver only when the measurement device stands in contact with a wall. In this case, the distance sensor mechanism may be used to verify a direct wall contact. It may be provided that light reflected back by the wall is received only when there is a particular minimum distance, so that the presence of a minimum distance from the wall to be examined may be confirmed on the basis of such a signal. Such a distance measurement using at least one ultrasound signal is also possible.

In principle, the distance sensor mechanism of the locating device may also be provided through mechanical methods. Here, all types of mechanical contact detection using switching elements are possible. When the device is placed onto the wall, or when a minimum distance of the device from the wall is crossed over, a switching element is automatically actuated, and the undershooting of a minimum distance is thus communicated to the control and evaluation unit of the measurement device.

The foregoing have in common that the signals of the wall distance sensors are evaluated, electronically or using software, by the locating device itself. On the basis of this additional information, a decision may be made as to whether a calibration measurement may be carried out or not. This decision may for example be made automatically in the control or evaluation unit of the measurement device. Thus, for example the user of the locating device may also be informed of a successful or failed calibration via a display or an audible signal. Likewise, the locating device may have an automatic mechanism, integrated in the device, that automatically calibrates the device when it is at a sufficient distance from the wall. In such an arrangement, there is in addition the advantage that the measurement device is already capable of functioning immediately after being switched on, because the calibration process has already been carried out, independent of the user.

The method for calibrating a measurement device, in particular for calibrating a handheld locating device for detecting objects enclosed in a medium, may provide that the reference measurement of the measurement device required for the calibration is not carried out until after at least one measurement has been carried out of a distance of the measurement device from a medium. In this manner, the method provides that a correct reference measurement for calibration is carried out. In particular, such a reference measurement for calibration is not carried out in certain measurement devices if a predeterminable minimum distance of the measurement device from the surface of a medium is undershot. In these measurement devices, such as for example inductive measurement devices, the presence of a medium at a distance from the measurement device that is less than a predeterminable minimum distance results in an errored calibration, and thus an increased risk of an errored measurement. If, for example in an inductive metal-locating device, a metallic object is within the range of the location sensor of the measurement device during the calibration, this can have the result that during object location the location sensor does not function, or, in the worst case, does not indicate an object that is actually present.

In addition, it is provided that the reference measurement for calibrating the measurement device is interrupted if a predeterminable minimum distance of such a measurement device from the surface of a medium is undershot during the reference measurement. In this manner, it is provided that a locating device is not for example placed on a wall prematurely.

The measurement device may inform its user when a predeterminable distance for the reference measurement for calibrating the measurement device has been undershot or crossed. This may for example be provided by an optical indication, possibly in the display of the measurement device, or also by an acoustic warning tone.

The method may automatically and independently carry out at least one reference measurement for calibrating the measurement device, given the presence of a predeterminable distance of the measurement device from the surface of a medium. This has the result that the locating device is available at short notice for locating an object enclosed in a medium.

The method may thus in particular also provide that the reference measurement for calibrating the measurement device is carried out only if the measurement device is situated on the surface of a medium to be measured. This specific case of the vanishing predeterminable distance of the measurement device from a medium may be applicable for example in the case of capacitive locating devices.

Additional aspects of the locating device, as well as of the method for calibrating a measurement device, are described in more detail below with reference to the appended Figures.

In the Figures, exemplary embodiments of the locating device are illustrated that are explained in more detail in the following description. The Figures and their description include numerous features in combination. A person skilled in the art will also consider the features individually and combine them to form additional combinations, which are thus also to be regarded as part of the present text.

BRIEF DESCRIPTION OF THE DRAWINGS

FIG. 6 illustrates a measurement device according to an example embodiment of the present invention having an alternative distance sensor mechanism, in a cross-sectional view, the measurement device being placed on a wall.

FIG. 7 illustrates the measurement device illustrated in FIG. 6, having a corresponding distance sensor mechanism, the measurement device being at a distance from the wall.

DETAILED DESCRIPTION

Figure 1:
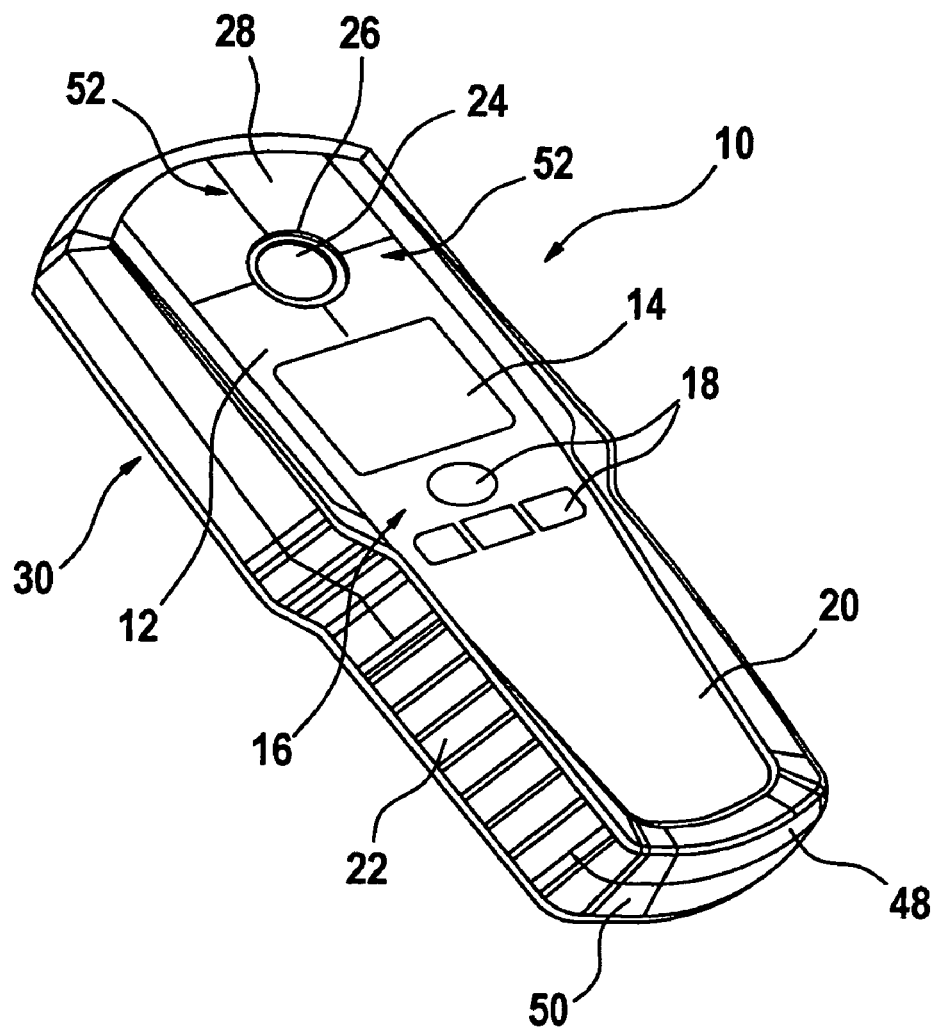
FIG. 1 illustrates a measurement device according to an example embodiment of the present invention in a simplified perspective overall view.

FIG. 1 illustrates a locating device 10 according to an example embodiment of the present invention in a perspective overview. The locating device has a housing 12 formed from an upper and lower half shell 48 or 50. Inside the housing there is provided at least one sensor (e.g., an inductive sensor as illustrated in FIG. 1), having a coil system for metal detection, an electronics system for signal production and evaluation, and an energy supply system, for example via batteries or accumulators. In addition, the locating device illustrated FIG. 1 has a display 14 for outputting an output signal correlated with the measurement signal. Via display 14, for example a segmented bar graph display or a graphic LCD display, it is possible to represent the strength of the detected measurement signal.

In addition, the locating device has an operating panel 16 having a series of operating elements 18 that make it possible, for example, to switch the device on and off, and to start a measurement process as necessary.

In the area underneath operating panel 16, the locating device illustrated in FIG. 1 has an area 20 fashioned in its shape and material design as a handle 22 for guiding the locating device. Using this handle 22, the locating device is guided with its underside 30 over a surface of an object or medium that is to be examined.

On the side 28 of locating device 10 situated opposite handle 22, the measurement device has an opening 24 that penetrates the housing. Opening 24 is formed by a sleeve 26 set into the housing 12, as well as by the upper and lower side of the housing of the measurement device. Opening 24 is situated concentrically in relation to a coil of the inductive sensor of the measurement device. In this manner, the location of opening 24 in the measurement device corresponds to the center of the location detector, so that the user is thus also simultaneously informed as to the exact position of a detected object. In addition, the measurement device also has, on its upper side, marking lines 52 via which the exact center of opening 24, and thus the position of an enclosed object, may be located.

During use, the locating device illustrated in FIG. 1 is guided along the surface of a medium to be examined with its underside 30. For this purpose, for example balls, rollers, or other rolling elements, etc., may be provided with which the device may be moved over a wall. Via the inductive sensor of the locating device, metallic objects enclosed in the wall may be located and may be brought to the attention of the user by display 14. The locating device has in its interior a distance sensor mechanism that makes it possible to detect the contact of the measurement device with the wall to be examined, or to detect the undershooting of a predeterminable minimum distance of the locating device from the wall to be examined. Depending on the distance sensor mechanism used, for this purpose the locating device has exit and entry openings on its underside for a measurement signal of the distance sensor mechanism.

In the following, certain arrangements of such a distance sensor mechanism are indicated, which however are not to be regarded as limiting.

Figure 2:
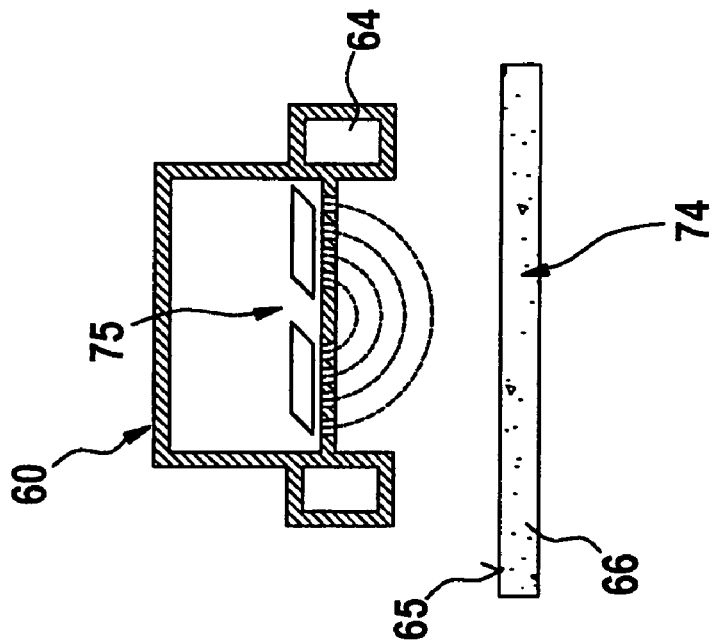
FIG. 2 is a schematic cross-sectional representation of a measurement device according to an example embodiment of the present invention in contact with a wall.

FIG. 2 illustrates a locating device in a schematic cross-sectional view. Locating device 56 illustrated to FIG. 2 has a housing 60 in which a sensor mechanism is integrated for the detection of objects enclosed in a medium. This sensor mechanism may be an inductive or capacitive sensor, a capacitive high-frequency sensor, or also a radar sensor, etc. In addition, locating device 56 has a distance sensor mechanism 62. In order to locate objects enclosed in a medium, locating device 56 is guided over a surface 65 of a medium as illustrated in FIG. 2, a wall 66) using balls or rollers 64 present on the device or housing 60. An object enclosed in the medium is located by a corresponding sensor. Besides the detection sensor, distance sensor mechanism 62 makes it possible to detect the contact of measurement device 56 with wall 66, or to provide a predeterminable minimum distance of the measurement device.

Distance sensor mechanism 62 of the locating device illustrated in FIG. 2 has a capacitive sensor 68 that may set up an electrical or electromagnetic field between its two capacitor elements 70 or 72, using a corresponding control electronics system of the device. The two electrodes of measurement capacitor 75 may be made of any conductive material in any possible arrangement. Metal, cables, and coils are in particular possibilities to be noted. The field 74 of the locating device, produced by measurement capacitor 75, is dimensioned such that when the measurement device is placed on wall 66 the field penetrates at least partly into the wall.

Figure 3:
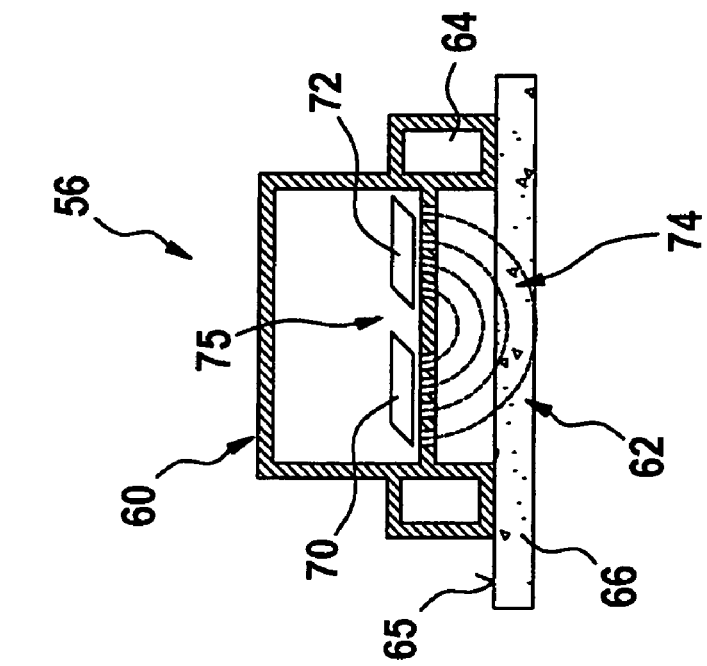
FIG. 3 is the schematic view of the measurement device illustrated in FIG. 2 in the case of a measurement device at a distance from a wall.

However, if, as is illustrated in FIG. 3, locating device 56 is removed from wall 66 with a minimum distance d, electrical field 74 of distance sensor mechanism 62 then no longer enters into wall 66, or does so only negligibly. Due to the differing dielectricity of the medium brought into field 74, the capacitance of measurement capacitor 75 of distance sensor mechanism 62 changes. Such a change in capacitance is measurable, and may be used in a direct signal for determining the wall contact, or for determining the presence of a minimum distance d from a wall.

If the locating device is for example a capacitive device or a high-frequency detector, then, given a corresponding wiring of the device, the measurement capacitor used to locate objects enclosed in a medium may also be used as capacitor 74 of distance sensor mechanism 62. In this case, it is possible to omit different sensors for locating the enclosed objects as well as for wall contact or wall proximity, so that a compact, efficient locating device may be provided.

The minimum distance d that is to be detected using distance sensor mechanism 62 may for example be empirically determined ahead of time, so that a corresponding configuration and situation of distance sensor mechanism 62 provides that not only the presence of a direct wall contact (cf., FIG. 2) but also the undershooting of a minimum distance d (cf., FIG. 3) may be reliably detected. Capacitive distance sensor mechanisms, as illustrated in FIG. 2 and in FIG. 3, may however also be integrated into inductive measurement devices or, for example, radar devices.

Figure 4:
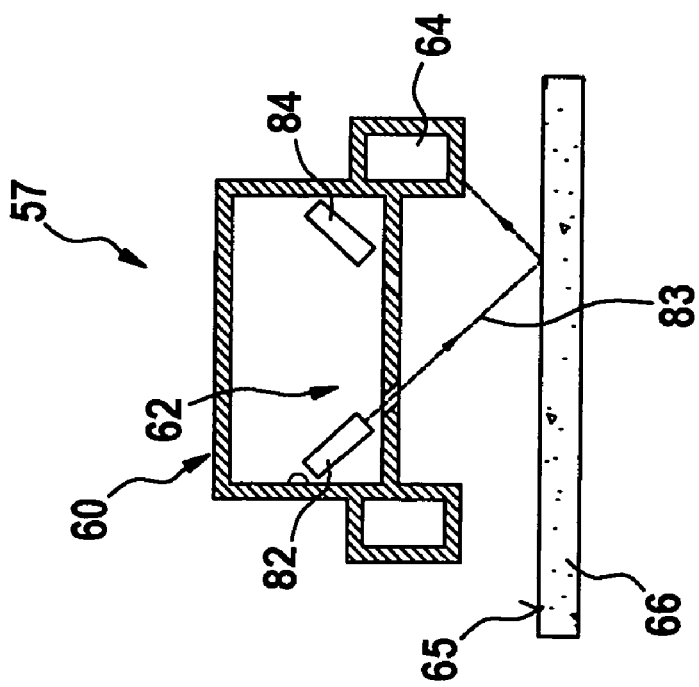
FIG. 4 illustrates a locating device according to an example embodiment of the present invention, the measurement device being placed on a wall.
Figure 5:
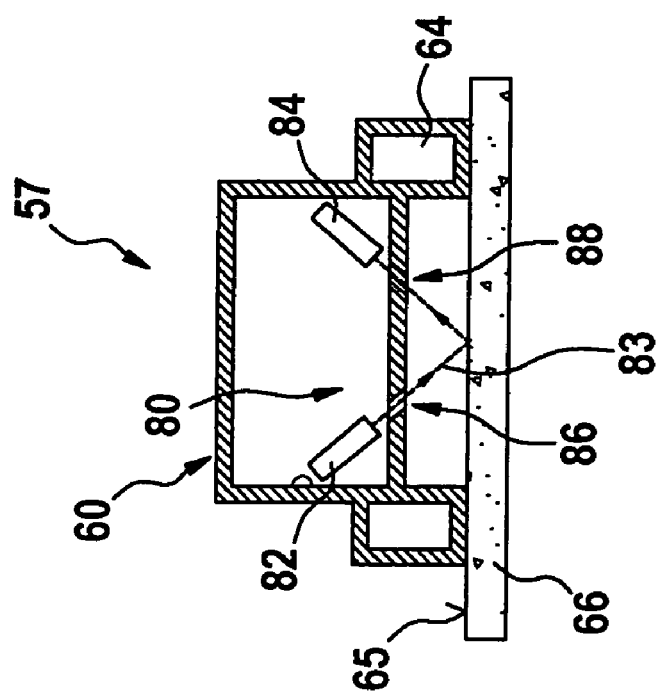
FIG. 5 illustrates the measurement device illustrated in FIG. 4 at a distance from the wall to be measured.

FIG. 4 and FIG. 5 illustrate a distance sensor mechanism for a measurement device. Locating device 57 illustrated in FIG. 4 and FIG. 5 may be an arbitrary locating device for detecting objects enclosed in a medium, such as for example an inductive device, a capacitive device, a mains voltage detector, a high-frequency detector, or a radar device, etc.

Locating device 57 uses for its distance sensor mechanism 62 an optical sensor 80, illustrated schematically in FIG. 4. Sensor 80 includes at least one light source 82, such as for example a laser or an LED, as well as a correspondingly situated light-sensitive receiver 84, such as for example a photodiode or a CCD element. The light 83 emitted by light source 82 is sent out through an opening 86 in the housing floor 30 of measurement device 57, and, in the case of a wall contact of locating device 57, is reflected from the surface 65 of this wall 66. The light reflected by wall 66 re-enters the measurement device through a corresponding opening 88 in floor 30 of measurement device 57, and there impinges on light-sensitive receiver 84.

Light-sensitive receiver 84 detects, at a defined angle, the radiation intensity of the light reflected by wall 66. In the exemplary embodiment illustrated in FIGS. 4 and 5, the angle is set such that light is reflected into receiver 84 only when there is wall contact. If, as is illustrated in FIG. 5, locating device 57 is removed and situated at a distance from surface 65 of wall 66, the light of optical sensor 80 reflected by wall 66 is not reflected back onto receiver 84. In this manner, the wall contact of locating device 57 may be reliably detected through evaluation of receiver 84, for example by the device-internal control and evaluation unit.

Thus, for example in the case of wall contact, as is illustrated in FIG. 4, a corresponding optical or acoustic signal is communicated to the user of the locating device. This signal may thus bring to the attention of the user of certain types of measurement device that in this case a reference measurement for calibrating the measurement device is not indicated, because the presence of wall 66 would falsify the measurement results of the reference or null measurement. In the case of capacitive measurement devices, which require a calibration on the wall, i.e. with a vanishing distance (d=0), the user may be informed, through the signaling of the wall contact, that he or she may now carry out a calibration measurement.

Instead of the optical signal, it is also possible to use, for example, an ultrasound signal for this type of distance sensor mechanism.

FIG. 6 and FIG. 7 illustrate an optical sensor 81 for a distance sensor mechanism 62 of a locating device. Locating device 58, which may use one or more conventional detection methods for locating an object enclosed in a medium, has a distance sensor mechanism 62 having a focused optics. Here, a light source 90, such as for example a laser, a laser diode, or else an LED, etc., casts light onto surface 65 of a wall 66 through a suitable optics 92, which in the example illustrated in FIG. 6 or 7 is represented by a schematized lens 94, forming a sharp light point or a light stroke, or any other corresponding geometric shape 96.

This light spot 96 becomes increasingly less sharp as the distance of locating device 58 from wall 66 increases, because the corresponding imaging requirements of optics 92 are no longer met. This unsharpness, imaged on wall 66, is evaluated by a suitable light-sensitive detector. Thus, for example, depending on the detector used, the shape of the light signal, i.e., the shape of light spot 96, its absolute brightness, or the brightness distribution over the surface, may be evaluated. With the aid of a receiving optics 100, illustrated in simplified fashion as lens 102 in FIG. 6 or 7, detection signal 104 is led to receive detector 98 of distance sensor mechanism 62 of location device 58.

Thus, for example via a characteristic quantity for the light intensity on the receive detector, the quantity being stored in the evaluation and control unit of the locating device, the approach of the locating device to a medium (symbolized by wall 66 as an example) may also be quantitatively acquired. If the locating device undershoots a minimum distance d from a medium, such as for example wall 66, then the device-internal calibration method may be blocked, for example by the device-internal control unit, and a signal, for example an optical or acoustic signal, may alert the user of the device that under the operating conditions obtaining at that moment a reference measurement for calibrating the measurement device may not be carried out, because this would result in a false measurement due to the presence of the medium (wall 66).

On the other hand, in this manner it may also be unambiguously detected whether the measurement device is placed on a wall, so that a calibration measurement may be carried out, for example for capacitive devices.

Thus, the locating device provides a method for calibrating a measurement device in which a reference measurement for calibrating the device is not carried out until after at least one measurement has been made for the detection of a distance d of the measurement device from a surface of a medium. In this manner, it may for example be provided that the reference measurement for calibrating the measurement device is not carried out, or is interrupted, if a predeterminable minimum distance of the measurement device from the surface of a medium is undershot, or is undershot during the reference measurement. On the other hand, it may also be provided that a contact of the measurement device with the surface of a medium exists, so that a reference measurement may be carried out, for example for capacitive measurement devices.

Distance sensor mechanism 62 of the measurement devices may be automated such that it is first automatically checked whether a predeterminable distance d from a medium is maintained, i.e., whether for example the current distance D of the locating device from a medium is greater than the predeterminable minimum distance d, and a reference measurement for calibrating the measurement device is thereupon carried out, and subsequently the successful calibration of the measurement device is indicated, for example in an optical display of the measurement device. A user of the locating device may thus begin directly with the measurement for detecting objects enclosed in a medium without first having to carry out a manual calibration.

Besides the described automatic calibration method, in the measurement devices it may also be provided that such a calibration mode may be activated in a user-controlled fashion, for example by a button on an operating panel.

The locating device, and in particular the distance sensor mechanism of such a locating device, is not limited to the forms indicated in the exemplary embodiments. In particular, the distance sensor mechanism is not limited to a capacitive or optical method. Ultrasound methods or radar methods may also be used. However, it is also possible for example to use mechanical methods, i.e., all types of mechanical contact detection, for example using switches, for the distance sensor mechanism of the locating device. Thus, for example by placing the device on a wall, a corresponding switch may be automatically actuated, and the switching process and the concomitant wall contact may be communicated to the control and evaluation unit of the measurement device.

The signals of the distance sensor mechanism are evaluated by the locating device electronically or using software, regardless of the type of wall distance sensor used in the individual case. Thus, for example the control unit of the detection sensor for locating object enclosed in a medium may decide, based on the signals of the distance sensor mechanism, whether calibration may take place or not under particular measurement conditions. Thus, for example, it is also possible to integrate an automated measurement system into the locating device that automatically calibrates the device when wall contact is not present, or when a distance is present that is greater than a minimum distance. Under these conditions, the user is provided at all times with a measurement system that is ready for operation, i.e., is calibrated.

The locating device is not limited to the use of an inductive or capacitive sensor for detecting objects enclosed in a medium. Rather, any locating device may be provided with a distance sensor mechanism.

The locating device, and the method on which it is based, are not limited to use with walls, ceilings, and floors. These are to be regarded only as a non-limiting selection in order to illustrate the manner of functioning.

What is claimed is:

1. A locating device for detecting objects enclosed in a medium, comprising: a first device adapted to detect objects enclosed in a medium; a control and evaluation unit for measurement signals of the locating device; and a second detection device adapted to detect whether the locating device is within a predeterminable distance from a surface of the medium; wherein the first device and the second detection device are adapted to detect in a same direction; wherein the locating device is arranged as a handheld locating device and is not enclosed in the medium.

2. The locating device according to claim 1, wherein the second detection device includes a capacitive sensor.

3. A locating device for detecting objects enclosed in a medium, comprising:
   a first device adapted to detect objects enclosed in a medium;
   a control and evaluation unit for measurement signals of the locating device; and
   a second detection device adapted to detect whether the locating device is within a predeterminable distance from a surface of the medium;
   wherein the first device and the second detection device are adapted to detect in a same direction;
   wherein the second detection device includes a capacitive sensor; and
   wherein the second detection device and the first detection device are arranged as a single capacitive sensor.

4. The locating device according to claim 1, wherein the second detection device includes an optical sensor.

5. The locating device according to claim 4, wherein the optical sensor includes at least one light source and a light-sensitive receiver.

6. The locating device according to claim 1, wherein the second detection device includes a mechanical sensor.

\* \* \* \* \*